United States Patent
Bulusu et al.

(10) Patent No.: US 11,544,148 B2
(45) Date of Patent: Jan. 3, 2023

(54) PRESERVING ERROR CONTEXT DURING A REBOOT OF A COMPUTING DEVICE

(71) Applicant: Microsoft Technology Licensing, LLC, Redmond, WA (US)

(72) Inventors: Mallik Bulusu, Bellevue, WA (US); Muhammad Ashfaq Ahmed, Redmond, WA (US); Tom Long Nguyen, Auburn, WA (US); Neeraj Ladkani, Bothell, WA (US); Ravi Mysore Shantamurthy, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/221,751

(22) Filed: Apr. 2, 2021

(65) Prior Publication Data

US 2022/0318093 A1  Oct. 6, 2022

(51) Int. Cl.
*G06F 11/00*  (2006.01)
*G06F 11/14*  (2006.01)
*G06F 11/07*  (2006.01)

(52) U.S. Cl.
CPC ...... *G06F 11/1417* (2013.01); *G06F 11/0784* (2013.01); *G06F 11/0787* (2013.01); *G06F 11/1438* (2013.01)

(58) Field of Classification Search
CPC .......... G06F 11/14717; G06F 11/0784; G06F 11/0787; G06F 11/1438; G06F 11/0778
See application file for complete search history.

(56) References Cited

U.S. PATENT DOCUMENTS

| | | |
|---|---|---|
| 8,122,290 B2 | 2/2012 | Walton et al. |
| 8,713,350 B2 | 4/2014 | Walton et al. |
| 10,552,280 B2 | 2/2020 | Bulusu et al. |
| 2003/0126516 A1 | 7/2003 | Komarla et al. |
| 2008/0126650 A1 | 5/2008 | Swanson et al. |

(Continued)

OTHER PUBLICATIONS

"System Management Mode deep dive: How SMM isolation hardens the platform", Retrieved From: https://www.microsoft.com/security/blog/2020/11/12/system-management-mode-deep-dive-how-smm-isolation-hardens-the-platform/, Nov. 12, 2020, pp. 1-10.

(Continued)

*Primary Examiner* — Joseph D Manoskey
(74) *Attorney, Agent, or Firm* — Ray Quinney & Nebeker P.C; James Bullough

(57) ABSTRACT

To preserve error context during a reboot of a computing device, firmware within the computing device can be configured to implement a method that includes determining where the error context is stored in volatile memory. The method can also include identifying a plurality of recorder regions in non-volatile memory that have been assigned to store the error context. The plurality of recorder regions can be disaggregated across a plurality of distinct non-volatile memory regions. The method can also include flushing the error context from a plurality of different volatile memory locations to the plurality of recorder regions in response to detecting a trigger. The flushing can occur prior to the reboot of the computing device. The method can also include restoring at least some of the error context to the volatile memory after the computing device has been rebooted.

20 Claims, 9 Drawing Sheets

(56) References Cited

U.S. PATENT DOCUMENTS

| | | | |
|---|---|---|---|
| 2011/0320877 | A1 | 12/2011 | Devarajan et al. |
| 2012/0101996 | A1* | 4/2012 | Lim ..................... G06F 16/128 |
| | | | 707/649 |
| 2013/0290789 | A1 | 10/2013 | Wen |
| 2016/0378579 | A1* | 12/2016 | Zhao ................... G06F 11/0751 |
| | | | 714/37 |
| 2019/0102245 | A1 | 4/2019 | Gim |
| 2019/0179628 | A1 | 6/2019 | Bulusu et al. |
| 2019/0278651 | A1 | 9/2019 | Thornley et al. |
| 2019/0332461 | A1* | 10/2019 | Chaiken .............. G06F 11/0778 |
| 2020/0133761 | A1* | 4/2020 | Paruthi ............... G06F 11/0778 |
| 2021/0064457 | A1* | 3/2021 | Paranjape ............. G06F 40/205 |
| 2021/0089411 | A1* | 3/2021 | Prasad ................ G06F 11/1471 |
| 2021/0303385 | A1* | 9/2021 | Almog .................. G06F 11/328 |

OTHER PUBLICATIONS

Priyadarsini, et al., "Failure Management in Cloud : An Overview", in International Journal of Advanced Research in Computer and Communication Engineering, vol. 2, Issue 10, Oct. 2013, pp. 4003-4009.

"Memory Allocation During Linux Booting?—Stack Overflow", Retrieved from: https://stackoverflow.com/questions/18610856/memory-allocation-during-linux-booting, Sep. 4, 2013, 2 Pages.

"International Search Report and Written Opinion Issued in PCT Application No. PCT/US22/021832", dated Jun. 15, 2022, 17 Pages.

* cited by examiner

PRESERVING ERROR CONTEXT DURING A REBOOT OF A COMPUTING DEVICE

BACKGROUND

Cloud computing is the delivery of computing services over the internet. Some examples of computing services that can be provided by a cloud computing system include storage, databases, networking, software, and analytics. The use of cloud computing technology has grown rapidly in recent years, due at least in part to the development of high-capacity networks as well as relatively low-cost computers and storage devices.

Broadly speaking, a cloud computing system includes two sections, a front end and a back end, that are in communication with one another via the internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the internet.

From time to time, a server in a cloud computing system can experience an unexpected failure. There are many different reasons why a server can fail. For example, a failure can occur when a computer program such as a software application or an operating system stops functioning properly. As another example, a failure can be caused by the malfunctioning of one or more hardware components.

It can be desirable to take certain actions when a failure occurs. For example, it can be desirable to capture error context. The term "error context" can refer to some or all of the contents of the server's memory when a failure occurs. Analyzing the error context can provide clues as to the cause of the server's failure. When a server experiences a failure, it can be desirable to capture the error context so that the error context can subsequently be analyzed.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

In accordance with one aspect of the present disclosure, a method is disclosed for preserving error context during a reboot of a computing device. The method is implemented by firmware within the computing device. The method includes determining where the error context is stored in volatile memory and identifying a plurality of recorder regions in non-volatile memory that have been assigned to store the error context. The plurality of recorder regions are disaggregated across a plurality of distinct non-volatile memory regions. The method also includes causing the error context from a plurality of different regions in the volatile memory to be saved to the plurality of recorder regions in response to detecting a trigger. The error context is saved to the plurality of recorder regions prior to the reboot of the computing device. The method also includes restoring at least some of the error context to the volatile memory after the computing device has been rebooted.

The plurality of recorder regions may include at least one of a first recorder region in a firmware region of the non-volatile memory, a second recorder region in a non-volatile memory partition that is created during a boot process of the computing device, or a third recorder region in an auxiliary service processor.

At least some of the error context may be included in an operating system context within the volatile memory.

Determining where the error context is stored in the volatile memory may include assigning, during a boot process of the computing device, one or more regions of the volatile memory to store the error context. Determining where the error context is stored in the volatile memory may also include communicating the one or more volatile memory regions to an operating system of the computing device.

The method may further include receiving notification from the operating system about at least one additional region of the volatile memory that the operating system has assigned to store the error context.

At least some of the error context may be included in one or more registers within one or more hardware devices that are part of the computing device.

Determining where the error context is stored in the volatile memory may include determining that the one or more registers have been assigned to store the error context when the one or more hardware devices are initialized during a boot process of the computing device.

The firmware may include system management mode (SMM) code that is executed by a processor of the computing device when the processor enters a system management mode. Causing the error context to be saved to the plurality of recorder regions may include executing at least a part of the SMM code.

Detecting the trigger may include detecting a system management interrupt (SMI) signal.

The computing device may be part of a cloud computing system that includes a management entity. The computing device may include an auxiliary service processor. The auxiliary service processor may cause the SMI signal to be generated in response to a command from the management entity.

The method may further include causing at least some of the error context to be transmitted to a remote location for analysis.

In accordance with another aspect of the present disclosure, a computing device is disclosed that includes one or more processors. The computing device also includes firmware that is executable by the one or more processors to determine where error context is stored in volatile memory and identify a plurality of recorder regions in non-volatile memory that have been assigned to store the error context. The plurality of recorder regions are disaggregated across a plurality of distinct non-volatile memory regions. The firmware is also executable by the one or more processors to cause the error context from a plurality of different regions in the volatile memory to be saved to the plurality of recorder regions in response to detecting a trigger that is associated with a reboot of the computing device. The error context is saved to the plurality of recorder regions prior to the reboot of the computing device. The firmware is also executable by the one or more processors to restore at least some of the error context to the volatile memory after the computing device has been rebooted.

The plurality of recorder regions may include at least two of a first recorder region in a firmware region of the non-volatile memory, a second recorder region in a non-volatile memory partition that is created during a boot process of the computing device, or a third recorder region in an auxiliary service processor.

At least some of the error context may be included in at least one of an operating system context within the volatile memory or one or more hardware registers within one or more hardware devices that are part of the computing device.

Detecting the trigger may include detecting a system management interrupt (SMI) signal. The computing device may be part of a cloud computing system that includes a management entity. The computing device may further include an auxiliary service processor. The auxiliary service processor may cause the SMI signal to be generated in response to a command from the management entity.

The firmware may be additionally executable by the one or more processors to cause at least some of the error context to be transmitted to a remote location for analysis.

In accordance with another aspect of the present disclosure, a cloud computing system is disclosed that includes a management entity and a plurality of servers. Each server among the plurality of servers includes one or more processors and an auxiliary service processor. Each server among the plurality of servers also includes firmware that is executable by the one or more processors to identify a plurality of recorder regions in non-volatile memory that have been assigned to store error context. The plurality of recorder regions are disaggregated across a plurality of distinct non-volatile memory regions. The firmware is also executable by the one or more processors to cause the error context from a plurality of different regions in volatile memory to be saved to the plurality of recorder regions in response to detecting a trigger that is generated by the auxiliary service processor in response to a command from the management entity. The firmware is also executable by the one or more processors to transmit at least some of the error context to a remote location for analysis.

The plurality of recorder regions may include a first recorder region in a firmware region of the non-volatile memory, a second recorder region in a non-volatile memory partition that is created during a boot process of a computing device, and a third recorder region in an auxiliary service processor.

At least some of the error context may be included in an operating system context within the volatile memory and one or more hardware registers within one or more hardware devices.

The firmware in a server is additionally executable by the one or more general purpose processors to restore at least some of the error context to volatile memory after the server has been rebooted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
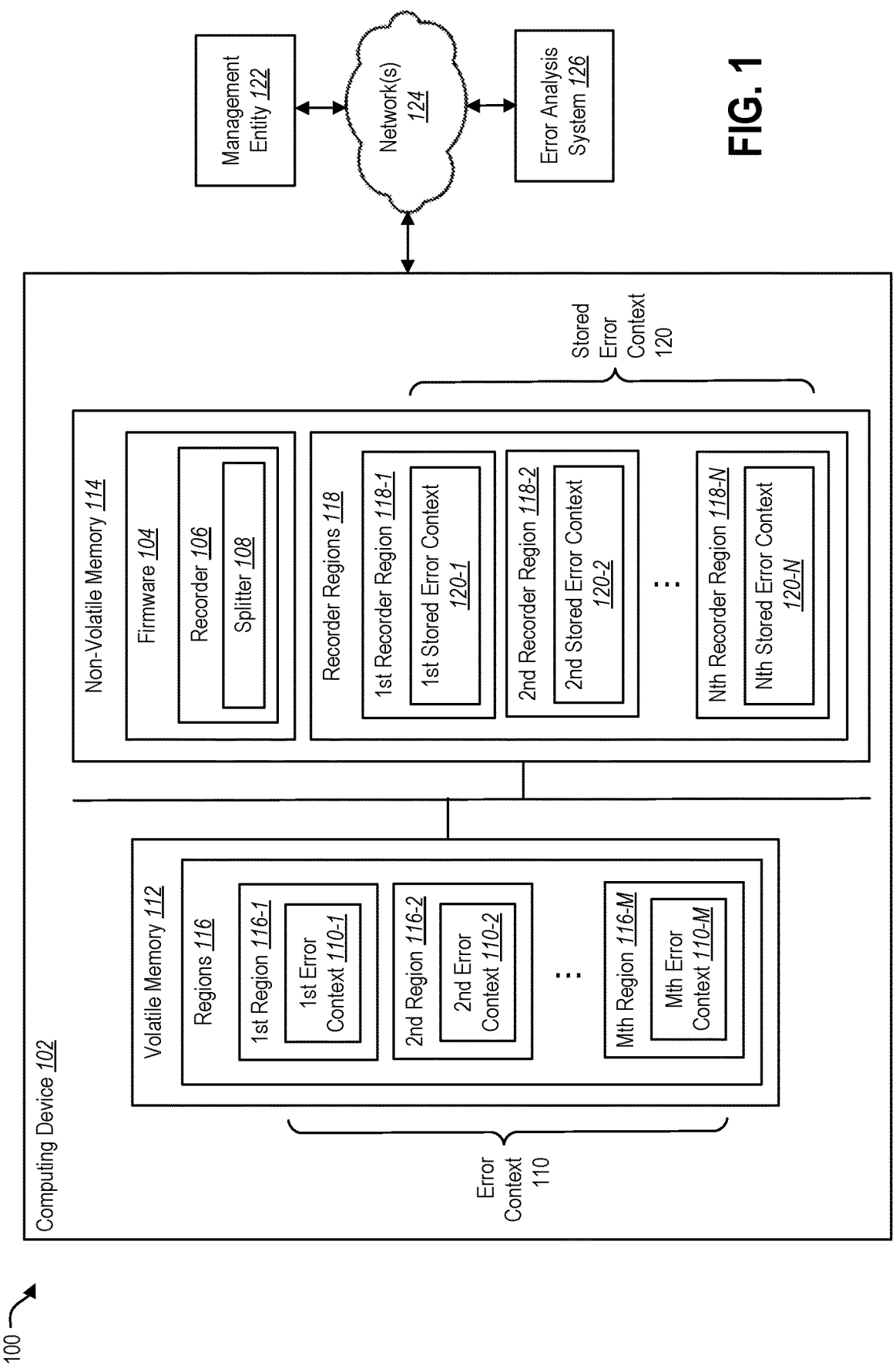
FIG. 1 illustrates an example of a system in which the techniques disclosed herein for preserving error context can be utilized.

As discussed above, it can be desirable to capture error context when a server in a cloud computing system experiences a failure. One challenge involved with capturing error context is the fact that much of the error context is stored in volatile memory. When a server experiences a failure, the server is typically rebooted. Unless the error context is captured before the reboot occurs, the error context will be lost when the server is rebooted.

Under some circumstances, error context can be sent over a network to a remote location for analysis before the server is rebooted. However, if the failure experienced by the server has disabled the server's network interface, this might not be possible.

The present disclosure proposes techniques for preserving error context during a reboot of a computing device, such as a server in a cloud computing system. In accordance with at least some embodiments of the present disclosure, firmware within the computing device can include a splitter that is configured to flush (or, in other words, transfer) the error context from volatile memory to various locations in non-volatile memory. In other words, the splitter can be configured to cause error context from a plurality of different regions in volatile memory to be saved to a plurality of different regions in non-volatile memory.

Broadly speaking, there are two different scenarios in which a reboot can occur. A first scenario is when the operating system closes all programs and finalizes all pending input and output operations before rebooting the computing device. This can be referred to as a "graceful" reboot. A graceful reboot can occur, for example, after new software is installed on a computing device. A second scenario is when the operating system is unable to finalize all pending input and output operations before rebooting the computing device (e.g., because the operating system is in a hung state). This can be referred to as a "non-graceful" reboot. Either scenario can occur in response to a computing device receiving a command to reboot from some type of management entity (e.g., a fabric controller).

The act of flushing the error context from volatile memory to non-volatile memory can be performed in response to detecting a trigger. The trigger can be any event or condition that causes the error context to be flushed from volatile memory to non-volatile memory. The trigger can be related to the reboot of the computing device. Different types of triggers can be used in different types of scenarios. In some embodiments (such as when a non-graceful reboot needs to be performed), the trigger can include detecting that the computing device is in a hung state and needs to be rebooted. In some embodiments, the trigger can include detecting a system management interrupt (SMI) signal. In some embodiments (such as when a graceful reboot is going to be performed), the trigger can include detecting a condition (e.g., the installation of software) that indicates that a planned reboot of the computing device is going to occur.

The act of flushing the error context from volatile memory to non-volatile memory can be performed prior to the reboot of the computing device. In this way, the error context can be preserved during the reboot of the computing device. After the computing device has been rebooted, the error context can be restored to the volatile memory. Restoring the error context to the volatile memory can include causing the error context to be re-saved to the volatile memory, either in the same location(s) where it was stored prior to the reboot or in new location(s).

In addition to restoring the error context, the error context can be utilized in various other ways as well. For example, under some circumstances at least some of the error context can be transmitted over a network to a remote location for analysis.

The act of flushing the error context from volatile memory to non-volatile memory can be analogized to the functions performed by a flight recorder in an airplane. A flight recorder is an electronic recording device placed in an aircraft for the purpose of facilitating the investigation of accidents and other kinds of incidents involving the aircraft. A flight recorder that is placed in a particular aircraft documents that aircraft's flight history, which may assist in any later investigation related to a crash or other incident involving the aircraft. In a similar way, the splitter and other components disclosed herein document a computing device's history, which may assist in any later investigation about why the computing device experienced a failure. Thus, the splitter and other components disclosed herein can be thought of as implementing a software-defined flight recorder for a computing device. As discussed above, the computing device can be part of a cloud computing system. Thus, the splitter and other components disclosed herein can be thought of as implementing a software-defined cloud system flight recorder.

FIG. 1 illustrates an example of a system 100 in which the techniques disclosed herein can be utilized. The system 100 includes a computing device 102. In some embodiments, the computing device 102 can be part of a cloud computing system.

The firmware 104 within the computing device 102 includes a recorder 106. The recorder 106 can be configured to implement the techniques disclosed herein for preserving error context.

The recorder 106 includes a splitter 108. The splitter 108 can be configured to flush error context 110 from one or more locations in volatile memory 112 to one or more locations in non-volatile memory 114.

The act of flushing the error context 110 from location(s) in volatile memory 112 to location(s) in non-volatile memory 114 can be performed in response to detecting a trigger. As noted above, the trigger can be related to the reboot of the computing device. In some embodiments, the trigger can include detecting that the computing device is in a hung state and needs to be rebooted. In some embodiments, the trigger can include detecting a system management interrupt (SMI) signal.

The act of flushing the error context 110 from location(s) in volatile memory 112 to location(s) in non-volatile memory 114 can be performed prior to the reboot of the computing device 102. In this way, the error context 110 can be preserved during the reboot of the computing device 102.

FIG. 1 shows error context 110 stored across a plurality of different regions 116 in the volatile memory 112. In particular, FIG. 1 shows error context 110 stored across M different regions 116 in the volatile memory 112, where the value of M can be any positive integer. First error context 110-1 is stored in a first region 116-1 in the volatile memory 112, second error context 110-2 is stored in a second region 116-2 in the volatile memory 112, and Mth error context 110-M is stored in an Mth region 116-M in the volatile memory 112.

As discussed above, the act of flushing the error context 110 from location(s) in volatile memory 112 to location(s) in non-volatile memory 114 can be analogized to the functions performed by a flight recorder in an airplane. In recognition of this analogy, the regions within the non-volatile memory 114 that include the stored error context 120 may be referred to herein as recorder regions 118.

The recorder 106 can flush the error context 110 from the M different regions 116 in the volatile memory 112 to a plurality of different recorder regions 118 in the non-volatile memory 114. FIG. 1 shows stored error context 120 included in N different recorder regions 118 in the non-volatile memory 114, where the value of N can be any positive integer. More specifically, FIG. 1 shows first stored error context 120-1 included in a first recorder region 118-1 in the non-volatile memory 114, second stored error context 120-2 included in a second recorder region 118-2 in the non-volatile memory 114, and Nth stored error context 110-N included in an Nth recorder region 118-N in the non-volatile memory 114.

The recorder regions 118 can be disaggregated across a plurality of distinct regions of the non-volatile memory 114. In other words, the recorder regions 118 can be separate regions of the non-volatile memory 114 that may not be contiguous with each another. In some embodiments the recorder regions 118 can be non-contiguous with respect to each other. For example, there can be one or more other regions located between the end of the first recorder region 118-1 and the beginning of the second recorder region 118-2. In some embodiments at least some of the recorder regions 118 can be located in different hardware devices within the computing device 102, as will be explained in greater detail below.

The number of regions 116 in the volatile memory 112 where the error context 110 is stored can be the same as or different than the number of recorder regions 118 in the non-volatile memory 114. In other words, the value of N can be equal to the value of M in some embodiments, whereas the value of N can be different than the value of M in other embodiments.

In some embodiments, each of the recorder regions 118 can be designated for storing error context 110 during a boot process of the computing device 102. In some embodiments, each of the recorder regions 118 can register with the splitter 108 to indicate that they are available to store error context 110. This registration process can also occur during a boot process of the computing device 102. In some embodiments, each of the recorder regions 118 can be designated for storing error context 110 via the registration process.

As noted above, the computing device 102 can be part of a cloud computing system. For example, the computing device 102 can be a server within a cloud computing system. The servers within a cloud computing system can be in electronic communication with a management entity 122 via one or more computer networks 124. The management entity 122 can be configured to perform management operations with respect to the servers of the cloud computing system. The management entity 122 can be a single computing device that performs the management operations or a combination of a plurality of computing devices that function together to perform the management operations. In some embodiments, the management entity 122 can be referred to as a fabric controller.

As discussed above, in response to a trigger, the splitter 108 can be configured to flush error context 110 from one or more regions 116 in the volatile memory 112 to one or more recorder regions 118 in the non-volatile memory 114. In some embodiments, the trigger can be initiated by the management entity 122. The trigger can be associated with a reboot of the computing device 102. After the error context 110 has been flushed from the region(s) 116 in the volatile memory 112 to the recorder region(s) 118 in the non-volatile memory 114, the computing device 102 can be rebooted.

After the computing device 102 has been rebooted, at least some of the stored error context 120 in the various recorder regions 118 can be restored to the volatile memory 112. In some embodiments, the stored error context 120 can be restored to the same locations in the volatile memory 112 where the error context 110 was stored prior to the rebooting of the computing device 102. In other embodiments, at least some of the stored error context 120 can be restored to locations in the volatile memory 112 that are different from the locations where the error context 110 was stored prior to the rebooting of the computing device 102.

In addition to restoring the stored error context 120 to volatile memory 112, the stored error context 120 can be utilized in various other ways as well. For example, under some circumstances at least some of the stored error context 120 can be transmitted to a remote location for analysis. FIG. 1 shows the computing device 102 in electronic communication with an error analysis system 126. Communication between the computing device 102 and the error analysis system 126 can occur via one or more computer networks 124. In some embodiments, at least some of the stored error context 120 can be sent to the error analysis system 126 via the computer network(s) 124.

Figure 2A:
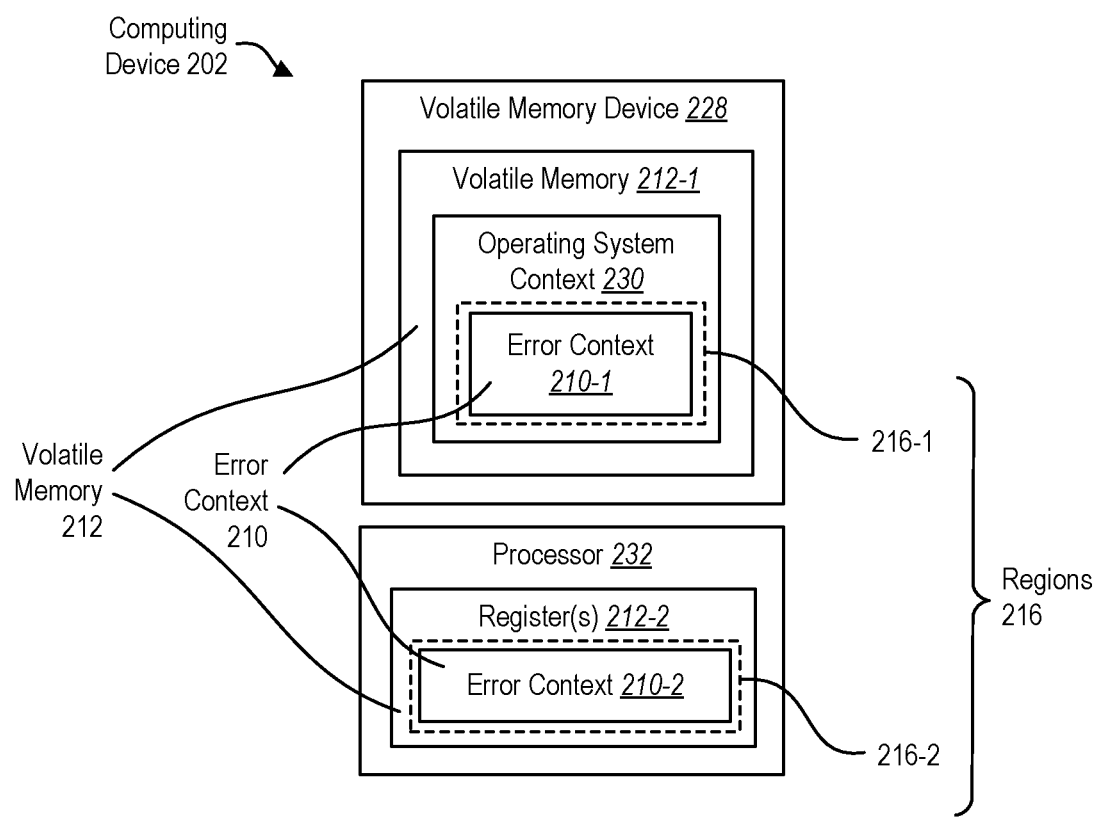
FIGS. 2A and 2B illustrate an example of a computing device that can implement the techniques disclosed herein for preserving error context.
Figure 2B:
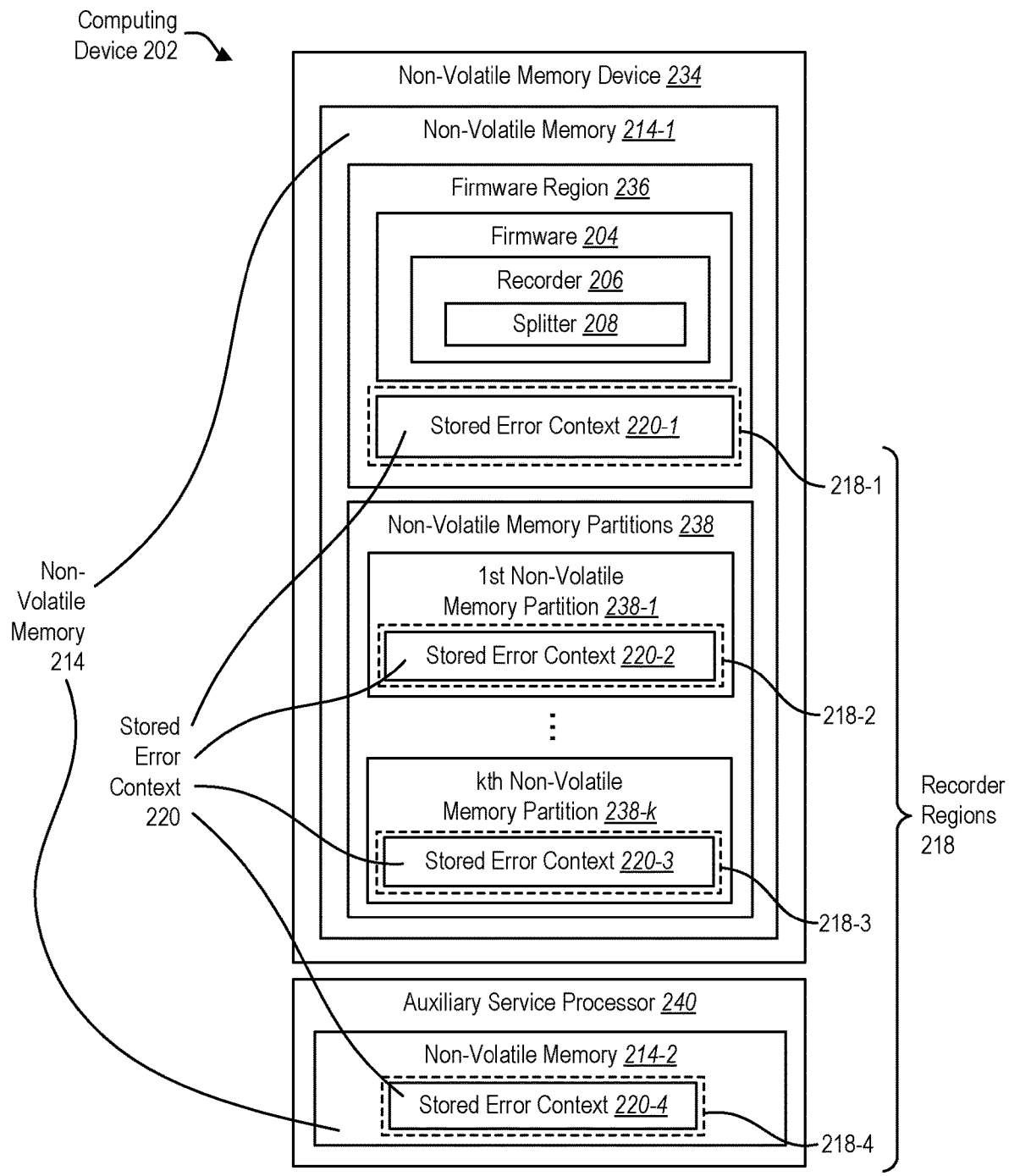

FIGS. 2A and 2B illustrate another example of a computing device 202 that can implement the techniques disclosed herein for preserving error context.

Reference is initially made to FIG. 2A. The computing device 202 includes a volatile memory device 228. The volatile memory device 228 includes volatile memory 212-1. The volatile memory 212-1 in the volatile memory device 228 can include operating system context 230 for an operating system that is running on the computing device 202. The operating system context 230 can include some or all of the contents of the volatile memory 212-1 that are related to the operating system. At least some error context 210-1 can be included among the operating system context 230.

The computing device 202 also includes a processor 232. The processor 232 can include one or more registers 212-2. At least some error context 210-2 can be included in the register(s) 212-2.

The register(s) 212-2 in the processor 232 can be implemented with non-volatile memory. Therefore, both the volatile memory 212-1 in the volatile memory device 228 and the register(s) 212-2 in the processor 232 are examples of volatile memory 212 within the computing device 202. Thus, the region(s) 216-1 in the volatile memory 212-1 where the error context 210-1 is stored and the region(s) 216-2 in the register(s) 212-2 in the processor 232 where error context 210-2 is stored are examples of regions 216 of volatile memory 212 where error context 210 can be stored. In other words, the region(s) 216-1 in the volatile memory 212-1 where the error context 210-1 is stored and the region(s) 216-2 in the register(s) 212-2 in the processor 232 where error context 210-2 is stored are examples of the regions 116 of the volatile memory 112 that are shown in FIG. 1.

Thus, in the example shown in FIG. 2A, the error context 210 is stored across a plurality of different locations in the volatile memory 212. Moreover, these different locations in the volatile memory 212 are distributed across different hardware devices within the computing device 202. In particular, error context 210-1 is included in a volatile memory device 228. Error context 210-2 is also included in register(s) 212-2 of a processor 232 within the computing device 202. The volatile memory device 228 and the processor 232 can be considered to be different hardware devices. Therefore, the error context 210-1 is stored in a different hardware device than the error context 210-2.

Of course, the specific locations in the volatile memory 212 where the error context 210 is stored in FIG. 2A are provided for purposes of example only and should not be interpreted as limiting the scope of the present disclosure. Error context 210 may also be included in other types of locations in volatile memory 212 besides those that are specifically shown in FIG. 2A.

Reference is now made to FIG. 2B. The computing device 202 also includes a non-volatile memory device 234. The non-volatile memory device 234 includes non-volatile memory 214-1.

The non-volatile memory 214-1 in the non-volatile memory device 234 includes a firmware region 236. The firmware region 236 is a portion of the non-volatile memory 214-1 that stores firmware 204. In accordance with the present disclosure, a portion of the firmware region 236 can be designated as a recorder region 218-1.

The non-volatile memory 214-1 in the non-volatile memory device 234 also includes a plurality of non-volatile memory partitions 238. In particular, the non-volatile memory 214-1 in the non-volatile memory device 234 includes k non-volatile memory partitions 238, where the value of k can be any positive integer. A first non-volatile memory partition 238-1 and a kth non-volatile memory partition 238-k are shown in FIG. 2. The non-volatile memory partitions 238 can be created during a boot process of the computing device 202 and designated as recorder regions 218. The first non-volatile memory partition 238-1 is shown as a recorder region 218-2 and the kth non-volatile memory partition 238-k is shown as a recorder region 218-3.

The computing device 202 also includes an auxiliary service processor 240. A portion of the non-volatile memory 214-2 within the auxiliary service processor 240 can be designated as a recorder region 218-4.

Thus, the computing device 202 in FIG. 2 includes several different recorder regions 218. One recorder region 218-1 is located in a portion of the firmware region 236 in the non-volatile memory 214-1. Additional recorder regions 218-2, 218-3 are located in the non-volatile memory partitions 238. Another recorder region 218-4 is located in a portion of the non-volatile memory 214-2 in the auxiliary service processor 240.

As the example shown in FIG. 2B demonstrates, recorder regions 218 can be located in different hardware devices. More specifically, the non-volatile memory device 234 and the auxiliary service processor 240 are different hardware devices. Some recorder regions 218-1, 218-2, 218-3 are provided in the non-volatile memory device 234. Another recorder region 218-4 is provided in the auxiliary service processor 240.

Even within the same hardware device, different recorder regions 218 can be disaggregated across distinct regions of non-volatile memory 214. For example, the non-volatile memory partitions 238 are located within the same hardware device (namely, the non-volatile memory device 234). However, the non-volatile memory partitions 238 can occupy different regions of the non-volatile memory 214-1 that may not be contiguous with each another. Therefore, the recorder regions 218-2, 218-3 can be located in distinct regions of the non-volatile memory 214-1.

Of course, the number of recorder regions 218 and the placement of the recorder regions 218 in FIG. 2B is provided for purposes of example only and should not be interpreted as limiting the scope of the present disclosure. In some embodiments, a different number of recorder regions 218 can be provided. Also, recorder regions 218 can be located in additional regions of non-volatile memory 214 other than those specifically shown in FIG. 2B.

The firmware 204 within the computing device 202 includes a recorder 206. The recorder 206 can be configured to implement the techniques disclosed herein for preserving error context.

The recorder 206 includes a splitter 208. The splitter 208 can be configured to flush error context 210 from one or more locations in the volatile memory 212 (such as the region(s) 216-1 in the volatile memory 212-1 where the error context 210-1 is stored and/or the region(s) 216-2 in the register(s) 212-2 in the processor 232 where the error context 210-2 is stored) to one or more locations in the non-volatile memory 214 (such as the recorder region 218-1 in a portion of the firmware region 236 in the non-volatile memory 214-1, the recorder regions 218-2, 218-3 in the non-volatile memory partitions 238, and/or the recorder region 218-4 in the non-volatile memory 214-2 in the auxiliary service processor 240).

After the error context 210 has been flushed to the recorder regions 218, it is shown as stored error context 220. Thus, the recorder region 218-1 in a portion of the firmware region 236 in the non-volatile memory 214-1 is shown with stored error context 220-1. The recorder region 218-2 in the first non-volatile memory partition 238-1 is shown with stored error context 220-2. The recorder region 218-3 in the kth non-volatile memory partition 238-k is shown with stored error context 220-3. The recorder region 218-4 in the non-volatile memory 214-2 in the auxiliary service processor 240 is shown with stored error context 220-4.

In some embodiments, the splitter 208 can be configured to flush error context 210-1 from the region(s) 216-1 in the volatile memory 212-1 and also to flush error context 210-2 from the region(s) 216-2 in the register(s) 212-2 in the processor 232. In some alternative embodiments, the splitter 208 can be configured so that it only flushes the error context 210-1 from the region(s) 216-1 in the volatile memory 212-1 but not from the region(s) 216-2 in the register(s) 212-2 in the processor 232. In still other alternative embodiments, the splitter 208 can be configured so that it only flushes the error context 210-2 from the region(s) 216-2 in the register(s) 212-2 in the processor 232 but not from the region(s) 216-1 in the volatile memory 212-1.

Figure 3:
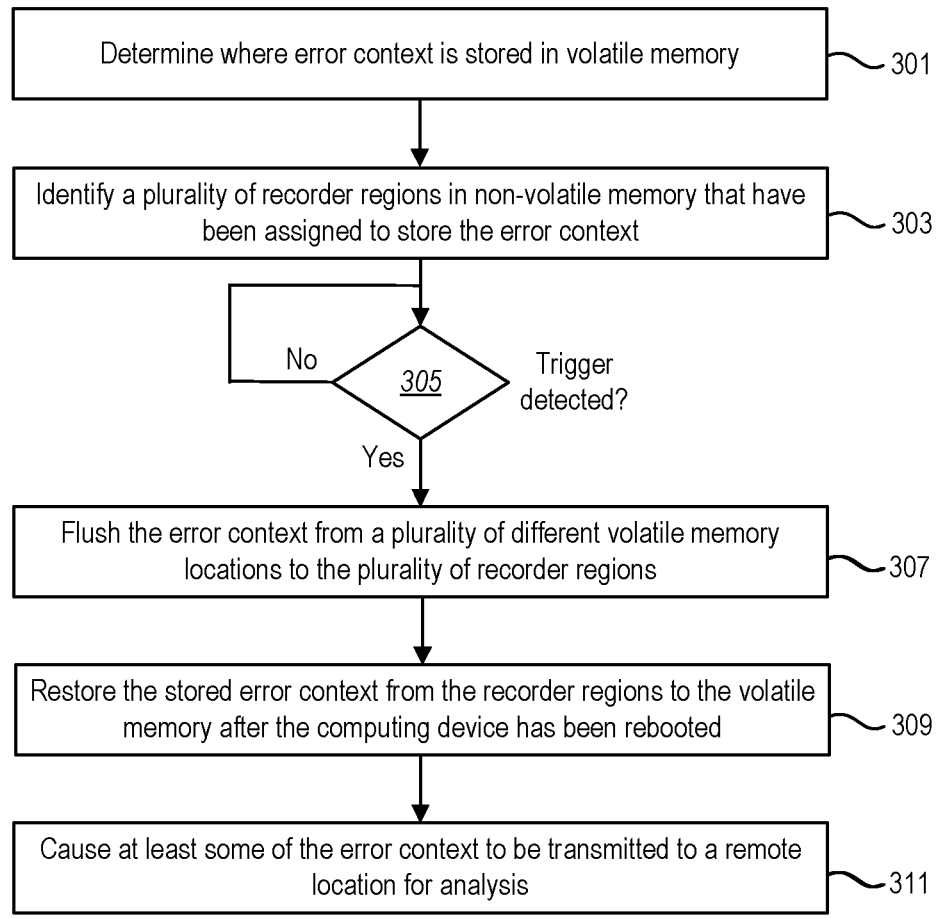
FIG. 3 illustrates a method for preserving error context during a reboot of a computing device in accordance with an embodiment of the present disclosure.

FIG. 3 illustrates a method 300 for preserving error context 210 during a reboot of a computing device 202 in accordance with an embodiment of the present disclosure. The method 300 can be implemented by firmware 204 within the computing device 202. For the sake of clarity, the method 300 will be described in relation to the computing device 202 that is shown in FIGS. 2A and 2B.

The method 300 can include determining 301 where error context 210 is stored in volatile memory 212. As discussed above, the error context 210 can be stored across a plurality of different locations in volatile memory 212. The specific acts involved in determining 301 where the error context 210 is stored in volatile memory 212 can differ depending on the particular location in volatile memory 212 where the error context 210 is being stored.

For example, as discussed above, error context 210-1 can be included as part of operating system context 230 in volatile memory 212-1 within a volatile memory device 228. In this case, determining where the error context 210-1 is stored in the volatile memory 212-1 can include assigning, during a boot process of the computing device 202, one or more regions 216-1 of the volatile memory 212-1 to store the error context 210-1. The firmware 204 can then notify the operating system about the region(s) 216-1 in the volatile memory 212-1 that have been assigned to store the error context 210-1. In some embodiments, this notification can occur via one or more Advanced Configuration and Power Interface (ACPI) methods.

After the boot process has completed, during run time, the operating system can change the assignments that were made by the firmware 204. For example, the operating system can designate one or more additional regions 216-1 in the volatile memory 212-1 for storing error context 210-1. The operating system can also reassign some of the regions 216-1 in the volatile memory 212-1 that the firmware previously assigned to store error context 210-1 so that they are no longer assigned to store error context 210-1. When the operating system makes changes to the assignments that were made by the firmware 204, the operating system can notify the firmware 204 about these changes. Again, this notification can occur via one or more ACPI methods. This will be discussed in greater detail below.

As also discussed above, error context 210-2 can additionally be included in one or more registers 212-2 that are included a processor 232 (or other type of integrated circuit) in the computing device 202. In this case, the act of determining where the error context 210-2 is stored can include identifying the region(s) 216-2 in the register(s) 212-2 in the processor 232 (or other type of integrated circuit) where the error context 210-2 is stored. This can occur, for example, during an initialization phase of a boot process of the computing device 202.

The method 300 can also include identifying 303 a plurality of recorder regions 218 in non-volatile memory 214 that have been assigned to store the error context 210. As discussed above, the plurality of recorder regions 218 can be disaggregated across a plurality of distinct regions of the non-volatile memory 214. In addition, at least some of the plurality of recorder regions 218 can be located in different hardware devices.

In some embodiments, the act of identifying 303 a plurality of recorder regions 218 in non-volatile memory 214 can occur, at least in part, during a boot process of the computing device 202. For example, when the firmware 204 is initializing the non-volatile memory 214 within the computing device 202 during a boot process, the firmware 204 can create one or more non-volatile memory partitions 238 that can be designated as recorder regions 218. As another example, the firmware 204 can communicate with an auxiliary service processor 240 during a boot process and find out whether the auxiliary service processor 240 has enough room in its non-volatile memory 214-2 so that the auxiliary service processor 240 can be designated as a recorder region 218.

In some embodiments, the act of identifying 303 a plurality of recorder regions 218 in non-volatile memory 214 can include a registration process. For example, at least some of the plurality of recorder regions 218 can register with the firmware 204. More specifically, at least some of the plurality of recorder regions 218 can register with a splitter 208 that is responsible for flushing the error context 210 from location(s) in the volatile memory 212 to location(s) in the non-volatile memory 214. This registration process can occur during a boot process of the computing device 202. In some embodiments, each of the recorder regions 218 can be designated for storing error context 210 via the registration process.

The method 300 can also include monitoring 305 the computing device 202 for a trigger that is associated with a reboot of the computing device 202 and that indicates that error context 210 should be flushed from location(s) in the volatile memory 212 to location(s) in the non-volatile memory 214. As noted above, in some embodiments the trigger can be a system management interrupt (SMI) signal that is received by the processor 232.

When the trigger is detected, the method 300 can include flushing 307 the error context 210 from one or more regions 216 in volatile memory to one or more recorder regions 218 in the non-volatile memory 214. The act of flushing 307 the error context 210 from volatile memory 212 to non-volatile memory 214 can be performed prior to the reboot of the computing device 202. In this way, the error context 210 can be preserved during the reboot of the computing device 202.

The method 300 can also include restoring 309 the stored error context 220 from the recorder regions 218 to the volatile memory 212. The act of restoring 309 the stored error context 220 can occur after the computing device 202 has been rebooted. In some embodiments, at least some of the stored error context 220 can be restored to the same regions 216 in the volatile memory 212 where the error context 210 was stored prior to the rebooting of the computing device 202. In other embodiments, at least some of the stored error context 220 can be restored to other locations in the volatile memory 212 that are different from the regions 216 where the error context 210 was stored prior to the rebooting of the computing device 202.

In addition to restoring 309 the stored error context 220 to volatile memory 212, the method 300 can also include utilizing the stored error context 220 in other ways as well. For example, under some circumstances the method 300 can include causing 311 at least some of the stored error context 220 to be transmitted to a remote location (such as the error analysis system 126 shown in FIG. 1) for analysis. In some embodiments, at least some of the stored error context 220 can be transmitted to a remote location via a network connection.

As discussed above in connection with FIG. 3, as part of a method 300 for preserving error context during a reboot of a computing device, the firmware can determine 301 where error context is stored in volatile memory. FIGS. 4A through 4D illustrate an example showing how this can occur.

Figure 4A:
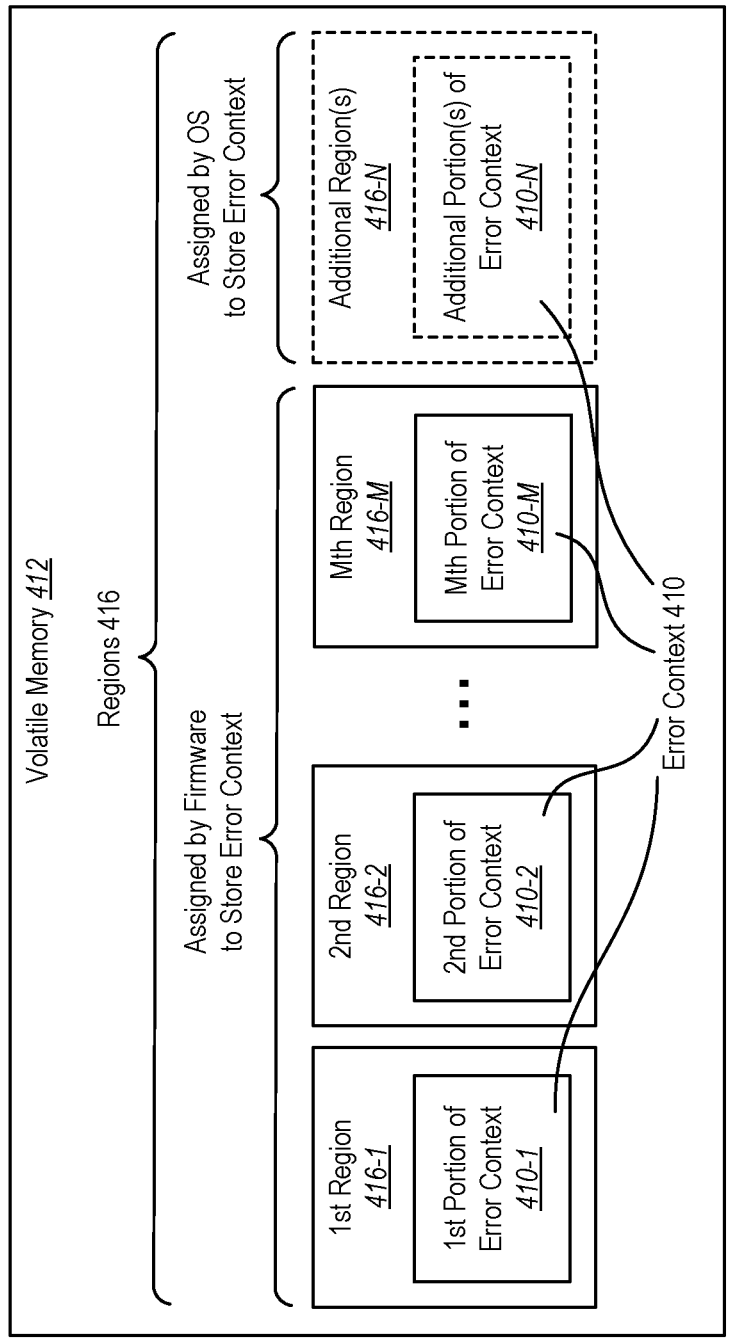
FIGS. 4A through 4D illustrate an example showing how error context can be identified in volatile memory.

Reference is initially made to FIG. 4A, which illustrates an example of volatile memory 412 within a computing device (such as the computing device 202 shown in FIGS. 2A and 2B).

The volatile memory 412 includes a plurality of different regions 416. More specifically, the volatile memory 412 includes M different regions 416, where M can be any positive integer. A first region 416-1, a second region 416-2, and an Mth region 416-M are shown in FIG. 4A. FIG. 4A also shows one or more additional regions 416-N.

The M regions 416-1, 416-2, . . . 416-M and the additional region(s) 416-N represent regions 416 in the volatile memory 412 that have been assigned to store error context 410. The first region 416-1 is shown with a first portion of error context 410-1, the second region 416-2 is shown with a second portion of error context 410-2, and the Mth region 416-M is shown with an Mth portion of error context 410-M. The additional region(s) 416-N are shown with additional portion(s) of error context 410-N.

In some embodiments, the firmware can assign the M regions 416-1, 416-2, . . . 416-M for storing error context 410-1, 410-2, . . . 410-M, and the operating system can assign the additional region(s) 416-N for storing additional portion(s) of error context 410-N. An example showing how these assignments can occur will be described below.

When used in connection with a memory device, the term "region" can refer to any segment, division, or partition within the memory device. The various regions 416 depicted in FIG. 4A can be contiguous or non-contiguous with respect to each other. For example, in some embodiments the first region 416-1 can be non-contiguous with respect to the second region 416-2. In other words, there can be one or more other regions located between the end of the first region 416-1 and the beginning of the second region 416-2. Alternatively, in other embodiments the first region 416-1 can be contiguous with respect to the second region 416-2. In other words, the end of the first region 416-1 can be immediately adjacent to the beginning of the second region 416-2, without any other regions between the end of the first region 416-1 and the beginning of the second region 416-2.

Figure 4B:
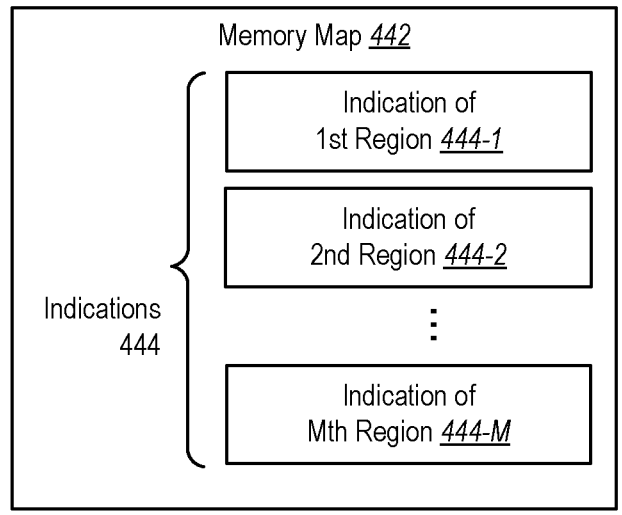

Reference is now made to FIG. 4B, which illustrates an example of a memory map 442 that can be created to communicate information about which regions 416 have been assigned to store error context 410. The memory map 442 can include an indication 444 of each region 416 that has been assigned by the firmware to store error context 410. In the depicted example, the memory map 442 is shown with an indication 444-1 of the first region 416, an indication 444-2 of the second region 416-2, and an indication 444-M of the Mth region 416-M.

Figure 4C:
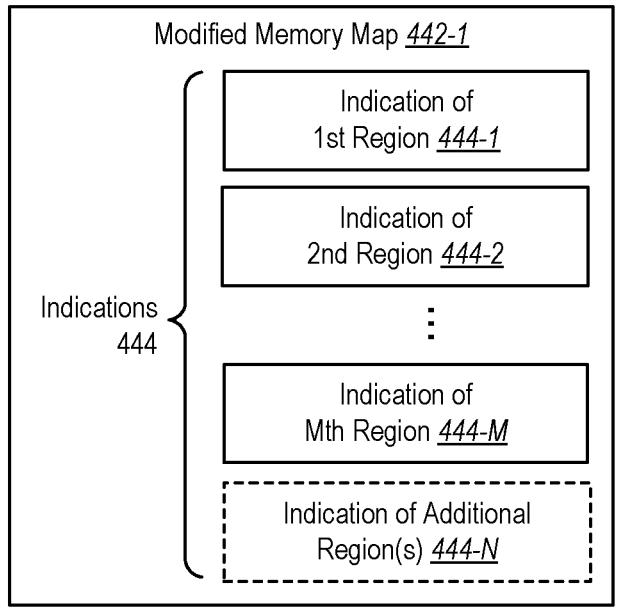

Reference is now made to FIG. 4C, which illustrates an example of a modified memory map 442-1. In some embodiments, the firmware can create the memory map 442 (shown in FIG. 4B) and communicate the memory map 442 to the operating system. If the operating system changes any of the assignments that were made by the firmware, the operating system can create a modified memory map 442-1 and communicate the modified memory map 442-1 to the firmware. This will be discussed in greater detail below.

The modified memory map 442-1 includes the indications 444-1, 444-2, . . . 444-M of the regions 416-1, 416-2, . . . 416-M that were previously assigned by the firmware to store error context 410. In addition, the modified memory map 442-1 also includes an indication 444-N of the additional region(s) 416-N that have been assigned to store error context 410 by the operating system.

Figure 4D:
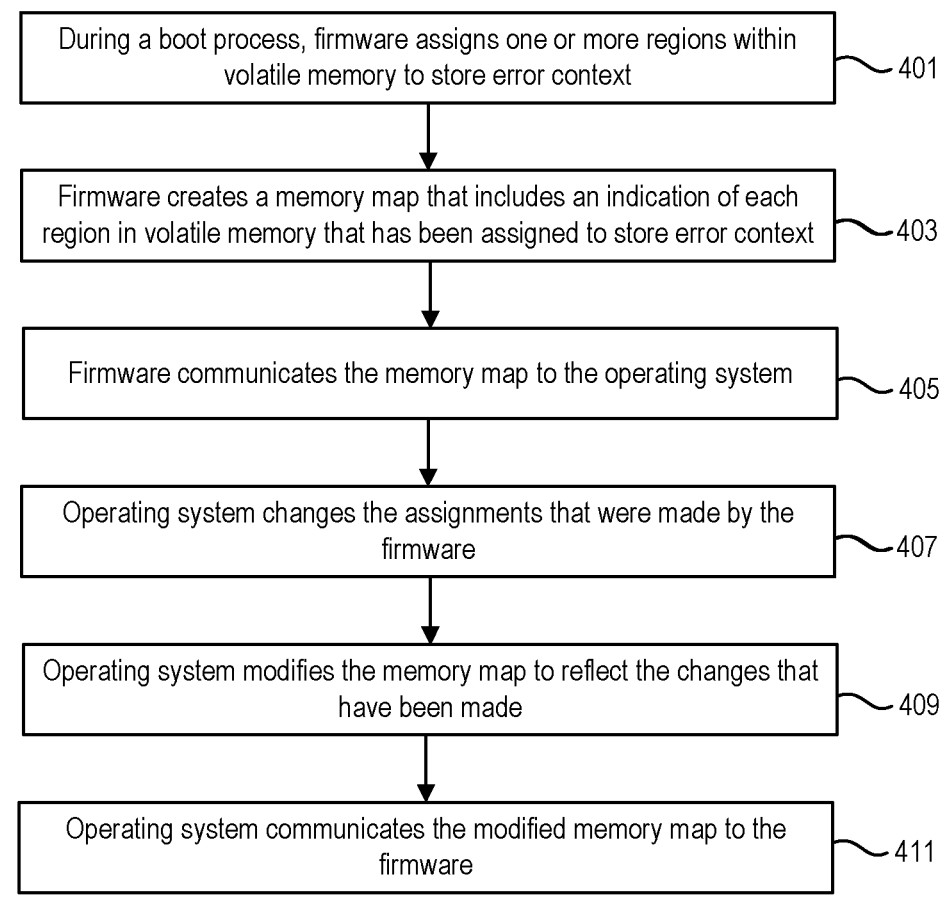

Reference is now made to FIG. 4D, which illustrates an example of a method 400 for determining where error context 410 is stored in volatile memory 412. The method 400 shown in FIG. 4D represents one possible implementation of the corresponding act 301 in the method 300 that was discussed above in connection with FIG. 3. The method 400 shown in FIG. 4D can be performed by a combination of the firmware and the operating system in a computing device.

In accordance with the method 400, the firmware can assign 401 one or more regions 416 within volatile memory 412 to store error context 410. In some embodiments, this can occur during a boot process of the computing device.

The firmware can also create 403 a memory map 442. The memory map 442 can include an indication 444 of each region 416 that has been assigned to store error context 410 (as shown in FIG. 4B, for example).

The firmware can communicate 405 the memory map 442 to the operating system. In some embodiments, the memory map 442 can be implemented as one or more ACPI tables, and the memory map 442 can be communicated to the operating system via one or more ACPI methods.

The operating system can change 407 the assignments that were made by the firmware. For example, the operating system can designate one or more additional regions 416-N for storing additional portion(s) of error context 410-N. The additional region(s) 416-N that are shown in dotted lines in FIG. 4A are intended to represent this kind of change.

The operating system can also reassign some of the regions 416 that the firmware previously assigned to store error context 410 so that they are no longer assigned to store error context 410. For example, the operating system could, during run time, decide to change the assignment of a previously assigned region 416 (e.g., the second region 416-2) so that it is no longer assigned to store error context 410.

The changes made by the operating system can occur during the normal run time of the computing device. In other words, the operating system can make changes after the boot process has been completed and control has been passed to the operating system.

When the operating system changes 407 any of the assignments that were made by the firmware, the operating system can modify 409 the memory map 442 to reflect the changes that have been made. For example, if the operating system has designated one or more additional regions 416-N for storing additional portion(s) of error context 410-N, the memory map 442 can be modified to include an indication 444-N of the additional region(s) 416-N that have been designated. If the operating system has reassigned one or more regions 416 so that they are no longer assigned to store error context 410, any indication(s) 444 of the reassigned region(s) 416 can be removed from the memory map 442.

When the operating system modifies the memory map 442, this results in the creation of a modified memory map 442-1. The operating system can communicate 411 the modified memory map 442-1 to the firmware. In some embodiments, the modified memory map 442-1 can be communicated to the firmware via one or more ACPI methods.

Figure 5:
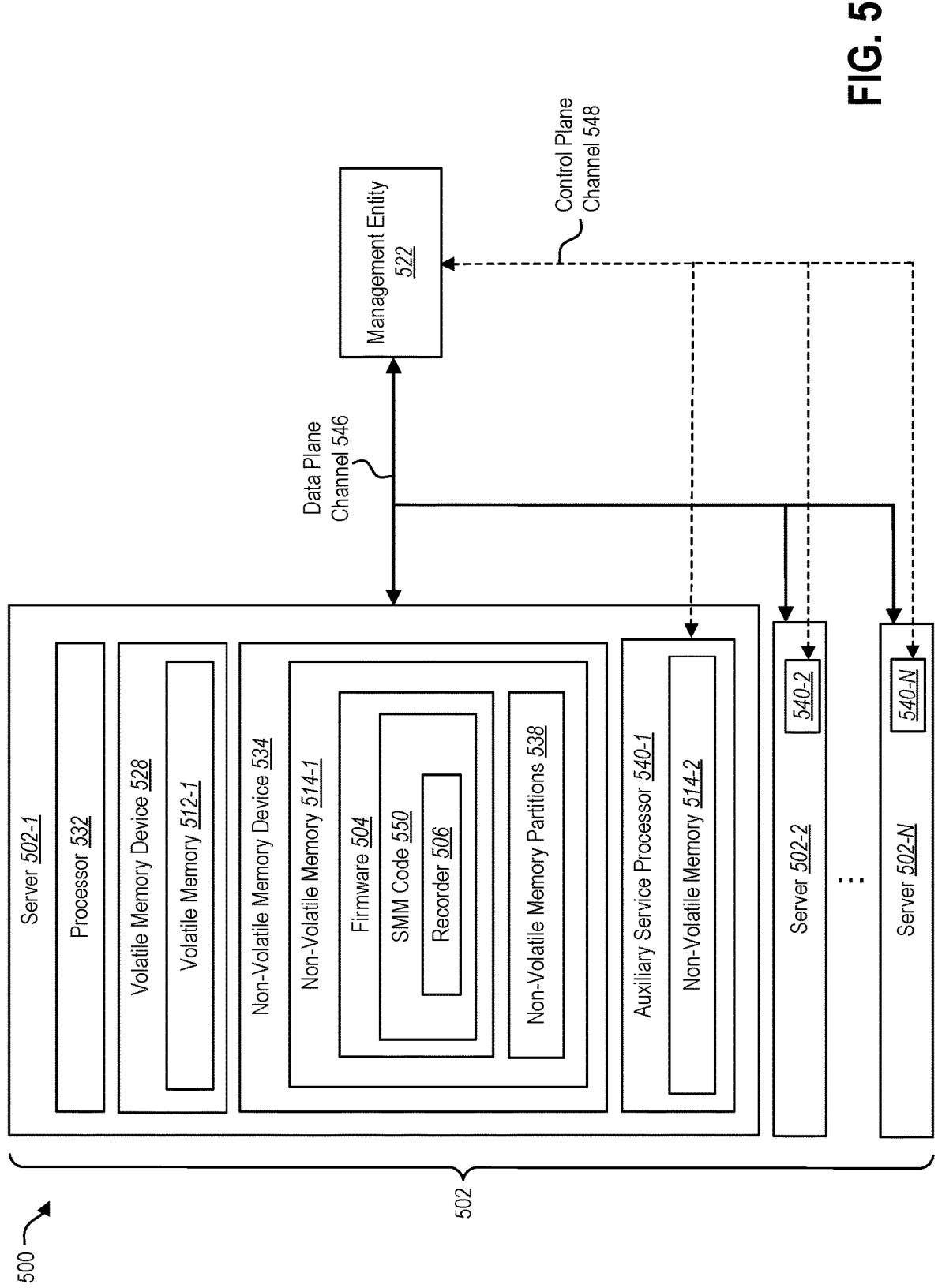
FIG. 5 illustrates a cloud computing system that includes a plurality of servers that are configured to implement the techniques disclosed herein for preserving error context.

As discussed above in connection with FIG. 3, a method 300 for preserving error context during a reboot of a computing device can include detecting a trigger signal. FIG. 5 illustrates an example showing how this can occur.

A plurality of computing devices are shown in FIG. 5. For purposes of the present discussion, it will be assumed that the plurality of computing devices are servers 502 in a cloud computing system 500.

A server 502-1 is shown with a processor 532, a volatile memory device 528 including volatile memory 512-1, a non-volatile memory device 534 including non-volatile memory 514-1, and an auxiliary service processor 540-1 including non-volatile memory 514-2. Firmware 504 in the non-volatile memory 514-1 includes a recorder 506. The non-volatile memory 514-1 also includes a plurality of non-volatile memory partitions 538. Each of these components in the server 502-1 can be configured similarly to the corresponding components in the computing device 202 that is shown in FIGS. 2A and 2B.

Additional servers 502-2 . . . 502-N are shown in FIG. 5. Each of these servers 502-2 . . . 502-N can be configured similarly to the server 502-1.

As noted above, the servers 502 within a cloud computing system 500 can be in electronic communication with a management entity 522. The management entity 522 can be configured to perform management operations with respect to the servers 502 of the cloud computing system 500.

There can be at least two different communication channels between the management entity 522 and the servers 502 in the cloud computing system 500. A first communication channel can be established via a data plane. This communication channel may be referred to herein as a data plane channel 546. In some embodiments, the data plane channel 546 can facilitate communication between the management entity 522 and the servers 502 via one or more computer networks (such as the network(s) 124 shown in FIG. 1). A second communication channel can be established via a control plane. This communication channel may be referred to herein as a control plane channel 548. The control plane channel 548 facilitates communication between the management entity 522 and the auxiliary service processors on the servers 502. In particular, FIG. 5 shows the control plane channel 548 facilitating communication between the management entity 522 and the auxiliary service processor 540-1 on the server 502-1, the auxiliary service processor 540-2 on the server 502-2, and the auxiliary service processor 540-N on the server 502-N.

The data plane channel 546 can be considered to be a primary communication channel between the management entity 522 and the servers 502. The control plane channel 548 can be considered to be a secondary communication channel (or an out-of-band communication channel) between the management entity 522 and the servers 502.

When the servers 502 are not accessible via the data plane channel 546, the management entity 522 may still be able to communicate with the servers 502 via the control plane channel 548. For example, if a particular server 502-1 crashes and becomes unresponsive via the data plane channel 546, the management entity 522 may be able to restart the server 502-1 by sending one or more commands to the auxiliary service processor 540-1 via the control plane channel 548.

As noted above, the recorder 506 can be implemented as part of the firmware 504 of the server 502-1. In some embodiments, the recorder 506 can be included in a part of the firmware 504 that is executed by the processor 532 when the processor 532 enters a system management mode (SMM). This part of the firmware may be referred to herein as SMM code 550.

The recorder 506 can be configured similarly to the recorder 206 that was discussed above in connection with FIGS. 2A and 2B. Thus, the recorder 506 can include a splitter (not shown in FIG. 5) that flushes error context from location(s) in volatile memory (e.g., the volatile memory 512-1, register(s) in the processor 532) to one or more recorder regions, which can be located in the non-volatile memory 514-1 in the non-volatile memory device 534 and/or in the non-volatile memory 514-2 in the auxiliary service processor 540-1.

In some embodiments, the trigger that causes the splitter within the recorder 506 to flush error context can be a system management interrupt (SMI) signal that is received by the processor 532. Detecting the SMI signal can cause the processor 532 to execute the recorder 506 within the SMM code 550.

In some embodiments, the SMI signal that causes the processor 532 to execute the recorder 506 within the SMM code 550 can be initiated by the management entity 522. For example, the management entity 522 can send one or more commands to the server 502-1 that cause the SMI signal to be generated. The command(s) can be sent from the management entity 522 to the server 502-1 via the data plane channel 546 or the control plane channel 548. In some embodiments, the management entity 522 can send the command(s) to the auxiliary service processor 532 (e.g., via the control plane channel 548), and the auxiliary service processor 532 can generate the SMI signal that causes the processor 532 to execute the recorder 506 within the SMM code 550.

The auxiliary service processor 540-1 can also be involved in transmitting at least some of the stored error context to a remote location for analysis. For example, the auxiliary service processor 540-1 can transmit the stored error context within the non-volatile memory 514-2 of the auxiliary service processor 540-1 to the management entity 522. Under some circumstances, this stored error context can be transmitted from the auxiliary service processor 540-1 to the management entity 522 via the control plane channel 548. In this case, it is not necessary to wait until the server 502-1 has been rebooted before transmitting at least some of the stored error context to a remote location. Instead, the auxiliary service processor 540-1 can transmit at least some of the stored error context to the management entity 522 before the server 502-1 is rebooted or while the server 502-1 is in the process of being rebooted. Once the management entity 522 has received the stored error context from the auxiliary service processor 540-1, the management entity 522 can analyze the stored error context and/or forward the stored error context to another entity (e.g., the error analysis system 126 shown in FIG. 1) for analysis.

Additional explanation will now be provided about some of the terms that have been used in the foregoing discussion.

Firmware is a specific class of computer software that provides the low-level control for the hardware of a computing device. Firmware can be stored in non-volatile memory devices such as read-only memory (ROM), erasable programmable ROM (EPROM), or electrically erasable programmable ROM (EEPROM). Firmware can be used to perform hardware initialization during a boot sequence of a computing device, and also to provide runtime services for operating systems and programs. Examples of computing device firmware include the Basic Input/Output System (BIOS) and the Unified Extensible Firmware Interface (UEFI).

The term "memory" can refer to any electronic component capable of storing electronic information. Memory can be volatile or non-volatile.

Volatile memory is computer memory that requires power to maintain the stored information. Volatile memory retains its contents while powered on but loses its contents when the power is interrupted. Some examples of volatile memory include static random-access memory (SRAM) and dynamic random-access memory (DRAM).

Non-volatile memory is a type of computer memory that can retain stored information even after power is removed. As used herein, the term non-volatile memory can include non-volatile storage. Some examples of non-volatile memory include flash memory, read-only memory (ROM), ferroelectric RAM, and magnetic computer storage devices (e.g., hard disk drives).

For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

A boot process can refer to an initial sequence of operations that a computing device performs when it starts. In a typical boot process, the central processing unit (CPU) executes firmware (e.g., BIOS, UEFI), which is stored in non-volatile memory. The firmware initializes the hardware components of the computing device, locates the operating system in non-volatile memory, loads the operating system into volatile memory (e.g., random access memory (RAM)), and transfers control to the operating system.

Rebooting can refer to the process by which a running computing device is restarted, either intentionally or unintentionally. A reboot can be either cold or warm. In a cold reboot (alternatively known as a hard reboot), the power to the computing device is physically turned off and back on again. In a warm reboot (alternatively known as a soft reboot), the computing device restarts without the need to interrupt the power. A restart refers to a reboot when the operating system closes all programs and finalizes all pending input and output operations before initiating a soft reboot. As discussed above, this may also be referred to as a "graceful" reboot.

An auxiliary service processor can be a specialized microcontroller within a computing device, separate from the general purpose processor. An example of an auxiliary service processor is a baseboard management controller (BMC). It can be useful for auxiliary service processors to be included in servers that are part of a cloud computing system because they allow system administrators to perform various tasks remotely. For example, a system administrator can use a management system (e.g., a fabric controller) to remotely communicate with an auxiliary service processor to take corrective actions, such as resetting or power cycling a server.

System management mode (SMM) is a special-purpose operating mode for processors in which all normal execution, including the operating system, is suspended. A processor can be configured to enter SMM in response to receiving a system management interrupt (SMI) signal. Once SMM has been entered, certain code within the firmware can then be executed with high privileges. SMM can be used to handle system-wide functions like hardware control and power management.

A system management interrupt (SMI) can refer to any signal that alerts the processor to an event or condition, and that serves as a request for the processor to interrupt the currently executing code when permitted in response to the event or condition. A processor can interrupt its currently executing code and perform one or more operations in response to receiving an SMI signal. In some embodiments, as discussed above, an SMI signal can cause a processor to interrupt its currently executing code and flush error context from location(s) in the volatile memory to location(s) in the non-volatile memory. As used herein, the term "system management interrupt" (or "SMI") should be interpreted broadly as applying to any type of processor architecture, including but not limited to processors that are based on the x86 family of instruction set architectures, processors that are based on a Complex Instruction Set Computing (CISC) architecture, and processors that are based on a Reduced Instruction Set Computing (RISC) architecture. As an example, for those familiar with the art, the Exception Levels in ARM architecture are equivalent to SMI in x86 architecture The Advanced Configuration and Power Interface (ACPI) provides an open standard that operating systems can use to perform various functions such as discovering and configuring computer hardware components and performing status monitoring. ACPI advertises the available components and their functions to the operating system kernel using methods provided through the system firmware, which the kernel parses.

Figure 6:
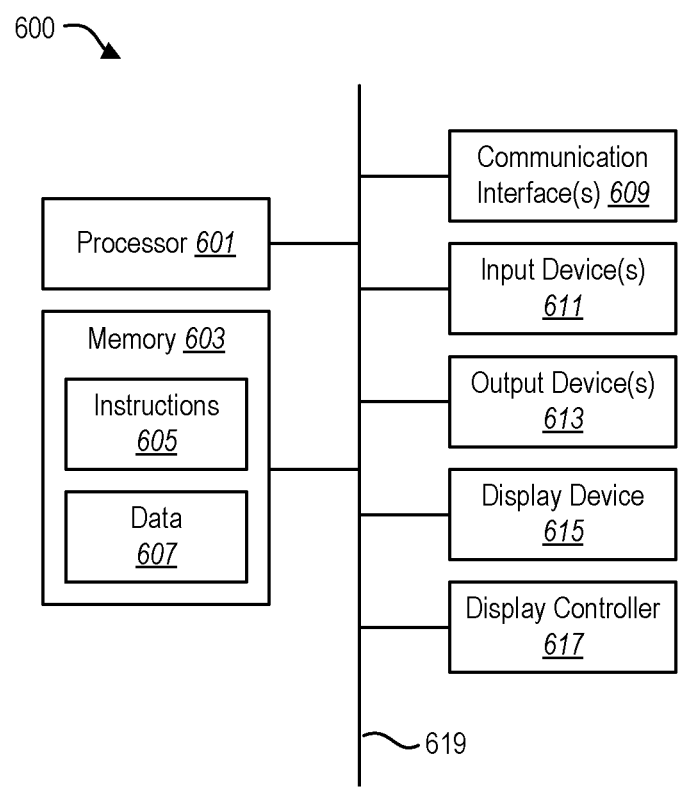
FIG. 6 illustrates certain components that can be included within a computing device.

Reference is now made to FIG. 6. One or more computing devices 600 can be used to implement at least some aspects of the techniques disclosed herein. FIG. 6 illustrates certain components that can be included within a computing device 600.

The computing device 600 includes a processor 601 and memory 603 in electronic communication with the processor 601. Instructions 605 and data 607 can be stored in the memory 603. The instructions 605 can be executable by the processor 601 to implement some or all of the methods, steps, operations, actions, or other functionality that is disclosed herein. Executing the instructions 605 can involve the use of the data 607 that is stored in the memory 603. Unless otherwise specified, any of the various examples of modules and components described herein can be implemented, partially or wholly, as instructions 605 stored in memory 603 and executed by the processor 601. Any of the various examples of data described herein can be among the data 607 that is stored in memory 603 and used during execution of the instructions 605 by the processor 601.

Although just a single processor 601 is shown in the computing device 600 of FIG. 6, in an alternative configuration, a combination of processors (e.g., an ARM and DSP) could be used.

The computing device 600 can also include one or more communication interfaces 609 for communicating with other electronic devices. The communication interface(s) 609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 600 can also include one or more input devices 611 and one or more output devices 613. Some examples of input devices 611 include a keyboard, mouse, microphone, remote control device, button, joystick, trackball, touchpad, and lightpen. One specific type of output device 613 that is typically included in a computing device 600 is a display device 615. Display devices 615 used with embodiments disclosed herein can utilize any suitable image projection technology, such as liquid crystal display (LCD), light-emitting diode (LED), gas plasma, electroluminescence, or the like. A display controller 617 can also be provided, for converting data 607 stored in the memory 603 into text, graphics, and/or moving images (as appropriate) shown on the display device 615. The computing device 600 can also include other types of output devices 613, such as a speaker, a printer, etc.

The various components of the computing device 600 can be coupled together by one or more buses, which can include a power bus, a control signal bus, a status signal bus, a data bus, etc. For the sake of clarity, the various buses are illustrated in FIG. 6 as a bus system 619.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein. The term "processor," as used herein, can refer to processors with or without cores and with or without threads.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for preserving error context during a reboot of a computing device, the method being implemented by firmware within the computing device, the method comprising:
   determining where the error context is stored in volatile memory;
   identifying a plurality of recorder regions in non-volatile memory that has been assigned to store the error context, wherein the plurality of recorder regions is disaggregated across a plurality of distinct non-volatile memory regions;
   communicating an indication of a recorder region of the plurality of recorder regions to an operating system of the computing device;
   causing the error context from the volatile memory to be saved to the plurality of recorder regions in the non-volatile memory in response to detecting a trigger, wherein the error context is saved to the plurality of recorder regions prior to the reboot of the computing device; and
   restoring at least some of the error context to the volatile memory after reboot of the computing device.

2. The method of claim 1, wherein the plurality of recorder regions comprises at least one of:
   a first recorder region in a firmware region of the non-volatile memory;
   a second recorder region in a non-volatile memory partition that is created during a boot process of the computing device; or
   a third recorder region in an auxiliary service processor.

3. The method of claim 1, wherein the error context includes operating system context for the operating system within the volatile memory.

4. The method of claim 1, wherein a location of the error context in the volatile memory is assigned during a boot process of the computing device.

5. The method of claim 4, further comprising receiving a notification from the operating system about at least one additional region of the volatile memory that the operating system has assigned to store the error context.

6. The method of claim 1, wherein the at least some of the error context is included in one or more registers within one or more hardware devices that are part of the computing device.

7. The method of claim 6, wherein determining where the error context is stored in the volatile memory comprises determining that the one or more registers have been assigned to store the error context when the one or more hardware devices are initialized during a boot process of the computing device.

8. The method of claim 1, wherein:
   the firmware comprises system management mode (SMM) code that is executed by a processor of the computing device when the processor enters a SMM; and
   causing the error context to be saved to the plurality of recorder regions comprises executing at least a part of the SMM code.

9. The method of claim 1, wherein detecting the trigger comprises detecting a system management interrupt (SMI) signal.

10. The method of claim 9, wherein:
    the computing device is part of a cloud computing system that comprises a management entity;
    the computing device comprises an auxiliary service processor; and
    the auxiliary service processor causes the SMI signal to be generated in response to a command from the management entity.

11. The method of claim 1, further comprising causing the at least some of the error context to be transmitted to a remote location for analysis.

12. A computing device, comprising:
    one or more processors; and
    firmware that is executable by the one or more processors to:
      determine where error context is stored in volatile memory;
      identify a plurality of recorder regions in non-volatile memory that has been assigned to store the error context, wherein the plurality of recorder regions is disaggregated across a plurality of distinct non-volatile memory regions;
      communicate an indication of a recorder region of the plurality of recorder regions to an operating system of the computing device;
      cause the error context from the volatile memory to be saved to the plurality of recorder regions in the volatile memory in response to detecting a trigger, wherein the error context is saved to the plurality of recorder regions prior to the reboot of the computing device; and
      restore at least some of the error context to the volatile memory after reboot of the computing device.

13. The computing device of claim 12, wherein the plurality of recorder regions comprises at least two of:

a first recorder region in a firmware region of the non-volatile memory;
a second recorder region in a non-volatile memory partition that is created during a boot process of the computing device; or
a third recorder region in an auxiliary service processor.

14. The computing device of claim 12, wherein at least some of the error context is included in at least one of:
an operating system context within the volatile memory; or
one or more hardware registers within one or more hardware devices that are part of the computing device.

15. The computing device of claim 12, wherein:
detecting the trigger comprises detecting a system management interrupt (SMI) signal;
the computing device is part of a cloud computing system that comprises a management entity;
the computing device further comprises an auxiliary service processor; and
the auxiliary service processor causes the SMI signal to be generated in response to a command from the management entity.

16. The computing device of claim 12, wherein the firmware is additionally executable by the one or more processors to cause the at least some of the error context to be transmitted to a remote location for analysis.

17. A cloud computing system, comprising:
a management entity; and
a plurality of servers, each server among the plurality of servers comprising one or more processors, an auxiliary service processor, and firmware that is executable by the one or more processors to:
identify a plurality of recorder regions in non-volatile memory that has been assigned to store the error context, wherein the plurality of recorder regions is disaggregated across a plurality of distinct non-volatile memory regions;
communicate an indication of a recorder region of the plurality of recorder regions to an operating system of the computing device
cause the error context from the volatile memory to be saved to the plurality of recorder regions in the non-volatile memory in response to detecting a trigger, wherein the error context is saved to the plurality of recorder regions prior to the reboot of the computing device; and
transmit at least some of the error context to a remote location for analysis.

18. The cloud computing system of claim 17, wherein the plurality of recorder regions comprises:
a first recorder region in a firmware region of the non-volatile memory;
a second recorder region in a non-volatile memory partition that is created during a boot process of a computing device; and
a third recorder region in an auxiliary service processor.

19. The cloud computing system of claim 17,
wherein the error context includes operating system context for the operating system within the volatile memory; and
wherein the at least some of the error context is included in one or more registers within one or more hardware devices that are part of the computing device.

20. The cloud computing system of claim 17, wherein the firmware is implemented in a server and is additionally executable by the one or more general purpose processors to restore at least some of the error context to volatile memory after reboot of the server.

\* \* \* \* \*